United States Patent
Ishii

(10) Patent No.: US 8,400,513 B2
(45) Date of Patent: Mar. 19, 2013

(54) DATA PROCESSING APPARATUS, DATA PROCESSING METHOD, AND DATA PROCESSING PROGRAM

(75) Inventor: Toshisada Ishii, Tokyo (JP)

(73) Assignee: Sony Corporation, Tokyo (JP)

( * ) Notice: Subject to any disclaimer, the term of this patent is extended or adjusted under 35 U.S.C. 154(b) by 976 days.

(21) Appl. No.: 12/164,634

(22) Filed: Jun. 30, 2008

(65) Prior Publication Data

US 2009/0059008 A1 Mar. 5, 2009

(30) Foreign Application Priority Data

Sep. 3, 2007 (JP) ................................. 2007-227454

(51) Int. Cl.
*H04N 5/225* (2006.01)
(52) U.S. Cl. ........................ 348/169; 382/103
(58) Field of Classification Search .................. 348/169; 382/103
See application file for complete search history.

(56) References Cited

U.S. PATENT DOCUMENTS

| | | | |
|---|---|---|---|
| 2003/0174220 A1* | 9/2003 | Ito | 348/240.2 |
| 2004/0213092 A1* | 10/2004 | Ueda et al. | 369/30.03 |
| 2005/0280809 A1 | 12/2005 | Hidai et al. | |
| 2006/0031767 A1* | 2/2006 | Nishizawa | 715/723 |
| 2006/0044955 A1* | 3/2006 | Komori et al. | 369/30.09 |
| 2006/0077265 A1* | 4/2006 | Matsumoto et al. | 348/231.99 |
| 2007/0091203 A1 | 4/2007 | Peker et al. | |
| 2008/0240686 A1* | 10/2008 | Nagaya et al. | 386/124 |

FOREIGN PATENT DOCUMENTS

| | | |
|---|---|---|
| EP | 1 260 934 A2 | 11/2002 |
| JP | 2002-176613 | 6/2002 |
| JP | 2004-30629 | 1/2004 |
| JP | 2004-221884 | 8/2004 |
| JP | 2005-141871 | 6/2005 |
| JP | 2005-157679 | 6/2005 |
| JP | 2007-036700 | 2/2007 |
| JP | 2007-281858 | 10/2007 |
| JP | 2008-205525 | 9/2008 |
| WO | WO 00/16243 | 3/2000 |

OTHER PUBLICATIONS

Mauro Barbieri, et al., "Video Summarization: Methods and Landscape", Proceedings of the SPIE—The International Society for Optical Engineering, SPIE, XP 002337434, vol. 5242, Sep. 7, 2003, pp. 1-13.

* cited by examiner

*Primary Examiner* — Abdullahi Salad
(74) *Attorney, Agent, or Firm* — Oblon, Spivak, McClelland, Maier & Neustadt, L.L.P.

(57) ABSTRACT

A data processing apparatus includes: a detection section detecting an image of an object from moving image data; a table creation section recording position information indicating a position on the moving image data in a table on the basis of a detection result by the detection section; a dubbing processing section performing dubbing processing on the moving image data; and a control section controlling the dubbing processing section so as to extract a portion of the moving image data recorded on a first recording medium on the basis of the position information recorded in the table, and to perform the dubbing processing on the extracted portion onto a second recording medium.

7 Claims, 13 Drawing Sheets

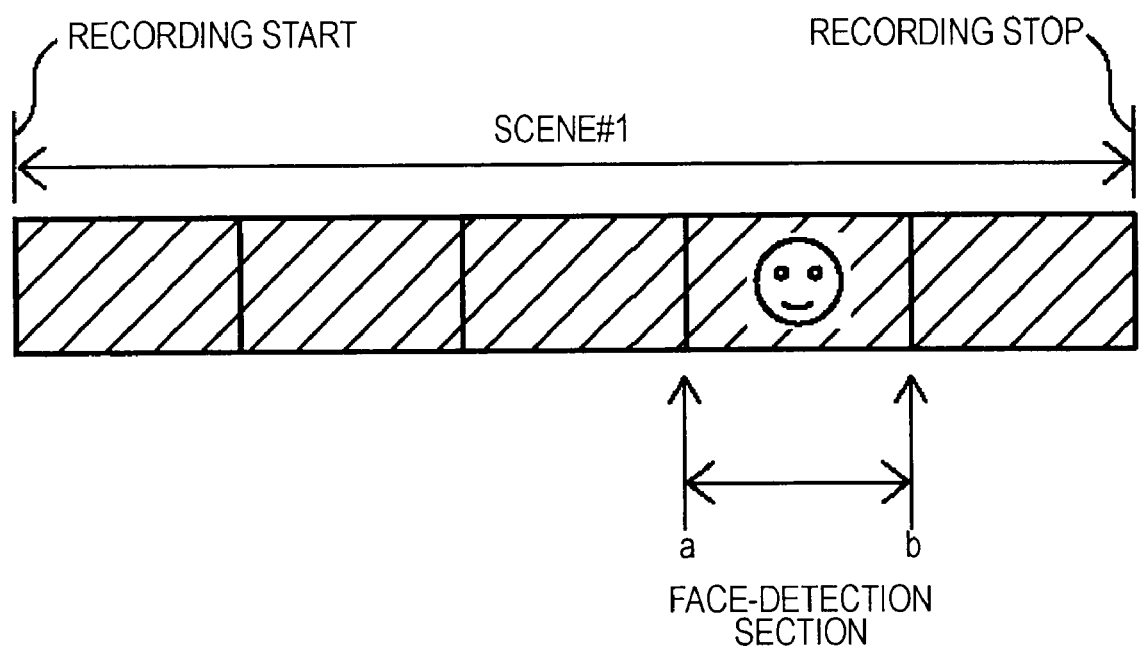

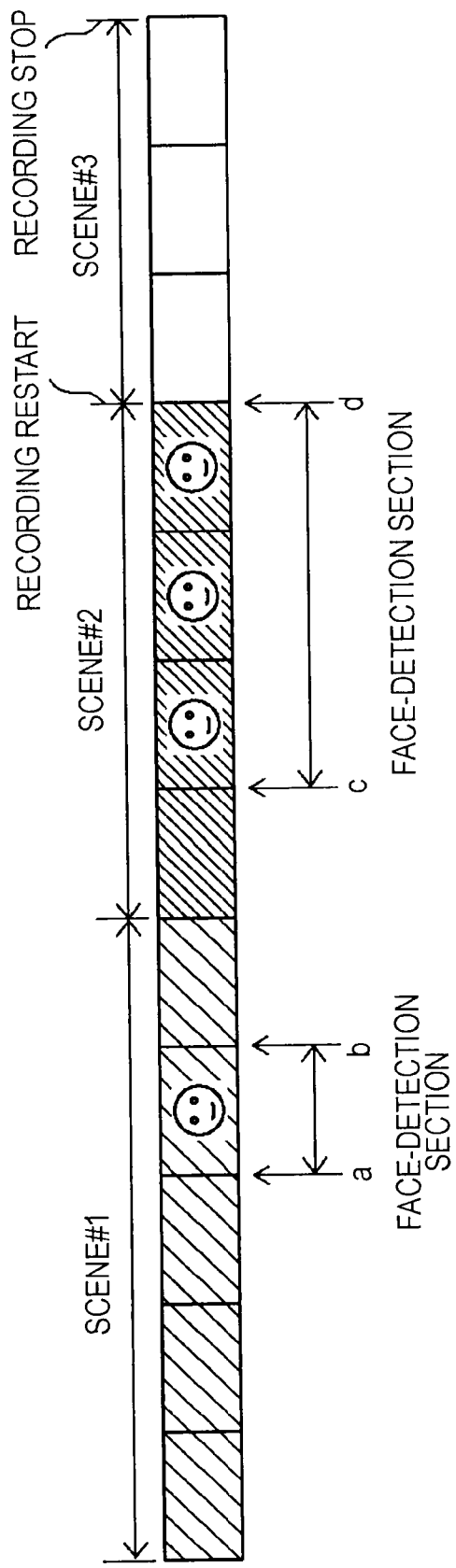

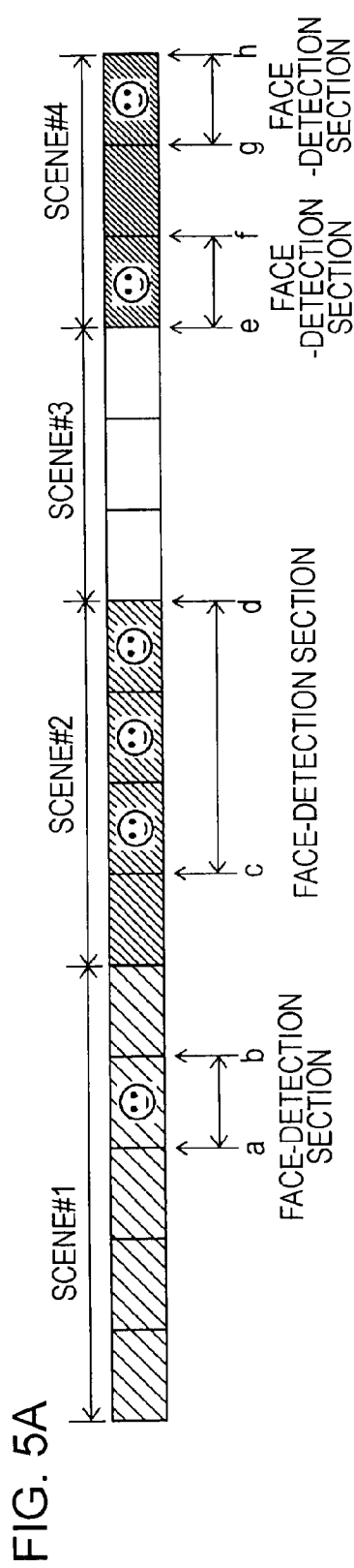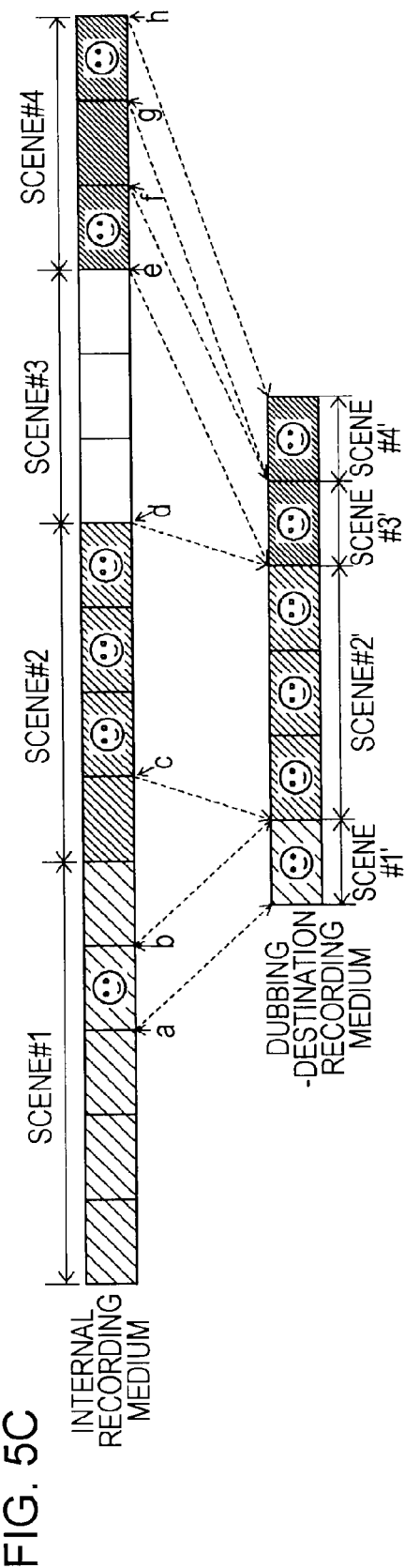
FIG. 5A
FIG. 5B
FIG. 5C

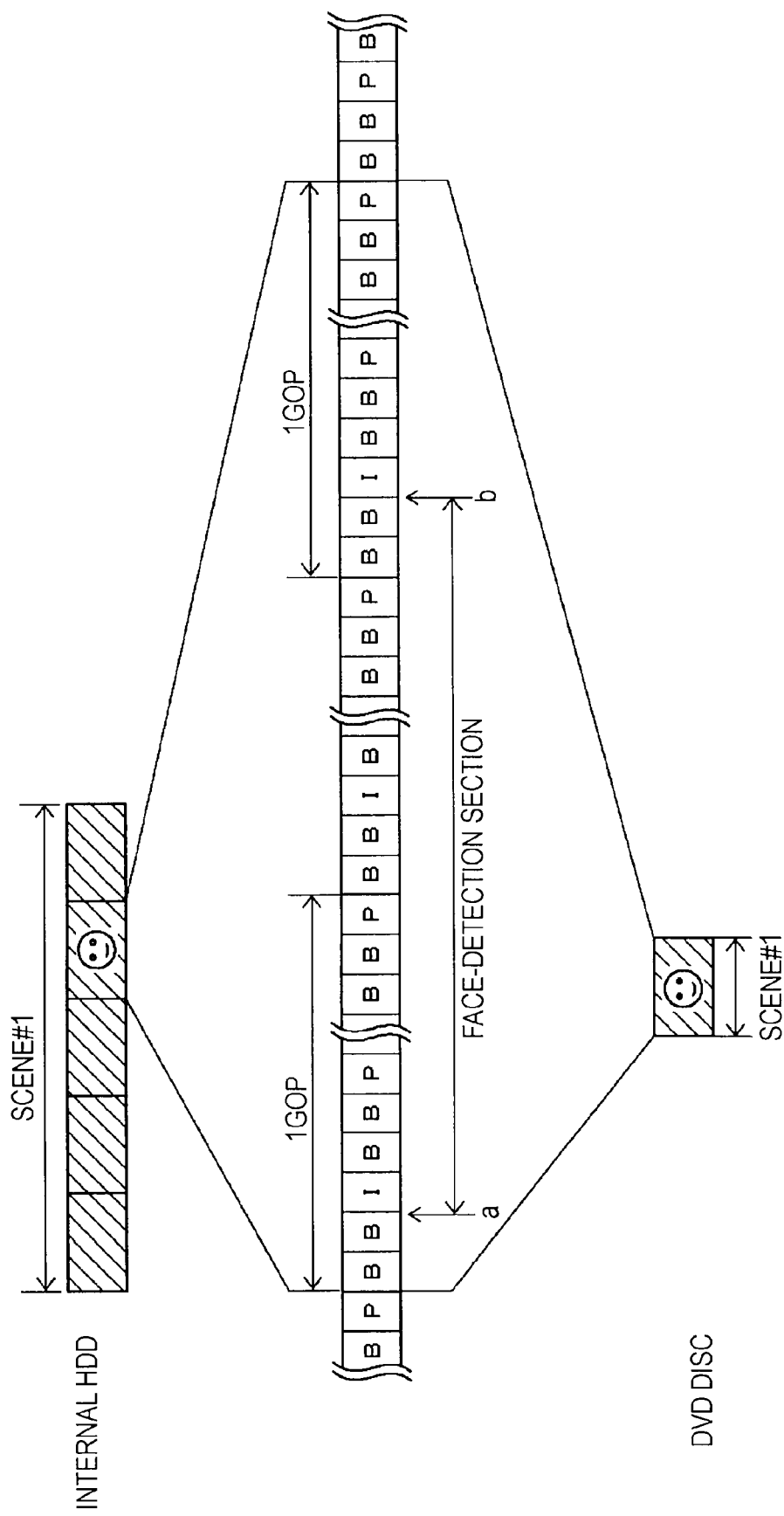

FIG. 10

| No. | SCENE No. | CHANGE POINT | NUMBER OF IMAGES AFTER CHANGE |
|---|---|---|---|
| 1 | #1 | $p_1$ | 1 |
| 2 | #1 | $q_1$ | 2 |
| 3 | #1 | $r_1$ | 3 |
| 4 | #1 | $p_2$ | 2 |
| 5 | #1 | $r_2$ | 1 |
| 6 | #1 | $q_2$ | 0 |
| 7 | #1 | $p_3$ | 1 |
| 8 | #1 | $p_4$ | 0 |

FIG. 12

| No. | SCENE No. | IDENTIFICATION INFORMATION | START POINT | END POINT |
|---|---|---|---|---|
| 1 | #1 | 001 | $p_1$ | $p_2$ |
| 2 | #1 | 002 | $q_1$ | $q_2$ |
| 3 | #1 | 003 | $r_1$ | $r_2$ |
| 4 | #1 | 001 | $p_3$ | $p_4$ |

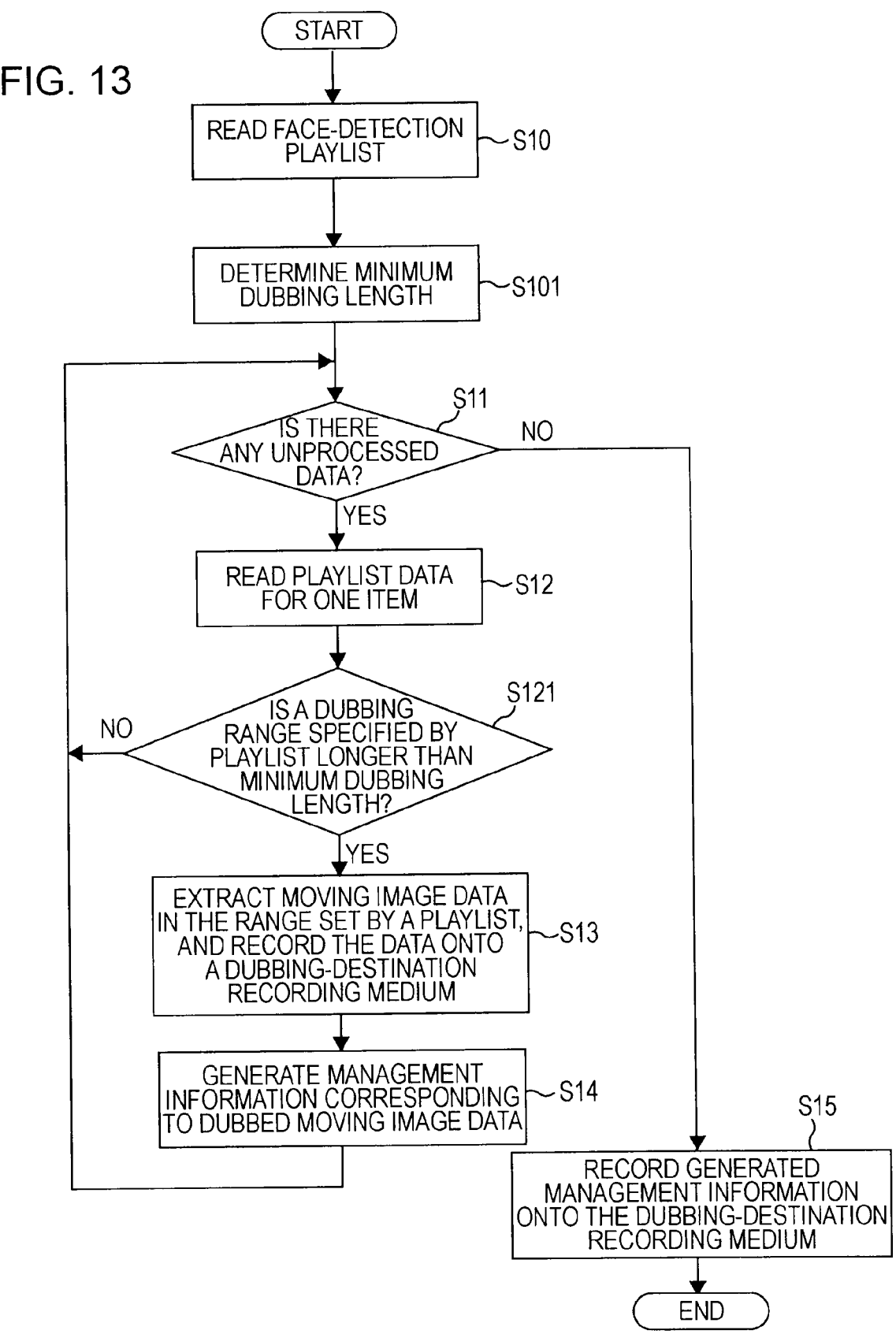

DATA PROCESSING APPARATUS, DATA PROCESSING METHOD, AND DATA PROCESSING PROGRAM

CROSS REFERENCES TO RELATED APPLICATIONS

The present invention contains subject matter related to Japanese Patent Application JP 2007-227454 filed in the Japanese Patent Office on Sep. 3, 2007, the entire contents of which are incorporated herein by reference.

BACKGROUND OF THE INVENTION

1. Field of the Invention

The present invention relates to a data processing apparatus, a data processing method, and a data processing program which are capable of easily extracting a predetermined portion from video data.

2. Description of the Related Art

In recent years, for portable video cameras, etc., many products having an internal hard disk for use as a recording medium on which captured moving image data is recorded are being developed. For example, a video camera includes a hard disk having a recording capacity of tens of giga bytes (GB) or hundreds of giga bytes (GB) or more, performs compression coding on video data obtained by capturing a subject image into a predetermined format, and records the data into the hard disk. The video camera can play back and decode the recorded video data from the hard disk to show the video images onto a display unit disposed on the video camera. Alternatively, the video camera can output the video data to the outside to show the video images onto a display unit having a larger screen.

Also, an internal recording medium, such as an internal hard disk of a video camera has a limited recording capacity. Thus, in order to store recorded video data, it is necessary to dub the video data onto a detachable recording medium from the camera, such as a recordable DVD (Digital Versatile Disc), for example. Also, when a user gives recorded video data to, for example, an acquaintance, etc., in general, the user dubs the video data onto a recordable DVD, and gives the DVD to the acquaintance.

As another example, when recorded video data is played back to be viewed, if an interesting scene, for example, a scene in which a person of interest appears is extracted from the video data, then the video data is edited, and the edited video data is recorded onto a recordable DVD (in the following, a "recordable DVD" is simply called a "DVD"), it is possible to efficiently play back only the video to be viewed. Also, in this case, the dubbing time of the video data recorded on the hard disk becomes preferably shorter compared with the case of dubbing the video data including unnecessary scenes.

Japanese Unexamined Patent Application Publication No. 2004-221884 has disclosed such a technique in which an interesting scene is extracted from the video data recorded on a recording medium to be edited, and the edited video data is collected to be dubbed onto another recording medium.

SUMMARY OF THE INVENTION

To date, the work of extracting an interesting scene from video data, editing, and dubbing the edited video data has been carried out only by manual work of a user while viewing the actual video. For example, the user repeatedly performs work of finding an interesting scene by playing back the video data, and specifying a start position (IN point) of the scene and an end point (OUT point). There has been a problem in that the work like this is very laborious and time consuming, and the editing work itself might make the user feel painful if he or she is not accustomed to the work.

It is therefore not desirable to provide a data processing apparatus, a data processing method, and a data processing program which are capable of easily selecting a predetermined scene from video data, and performing dubbing.

In order to solve the above-described problem, according to an embodiment of the present invention, there is provided a data processing apparatus including: a detection section detecting an image of an object from a moving image data; a table creation section recording position information indicating a position on the moving image data in a table on the basis of a detection result by the detection section; a dubbing processing section performing dubbing processing on the moving image data; and a control section controlling the dubbing processing section so as to extract a portion of the moving image data recorded on a first recording medium on the basis of the position information recorded in the table, and to perform the dubbing processing on the extracted portion onto a second recording medium.

According to another embodiment of the present invention, there is provided a method of processing data, including: detecting an image of an object from moving image data; recording position information indicating a position on the moving image data in a table on the basis of a detection result by the step of detecting; performing dubbing processing on the moving image data; and controlling the step of performing dubbing processing so as to extract a portion of the moving image data recorded on a first recording medium, and to perform dubbing processing on the extracted portion on a second recording medium.

According to another embodiment of the present invention, there is provided a program for causing a computer to perform a method of processing data, including: detecting an image of an object from moving image data; recording position information indicating a position on the moving image data in a table on the basis of a detection result by the step of detecting; performing dubbing processing on the moving image data; and controlling the step of performing dubbing processing so as to extract a portion of the moving image data recorded on a first recording medium, and to perform dubbing processing on the extracted portion on a second recording medium.

As described above, by an embodiment of the present invention, position information indicating a position on the moving image data is recorded in a table on the basis of a detection result of an image of an object from moving image data, dubbing processing is performed on the moving image data, and the dubbing is controlled so as to extract a portion of the moving image data to be recorded on a first recording medium on the basis of the position information recorded in the table, and to perform the dubbing processing on the extracted portion onto a second recording medium. Thus, it is possible to selectively extract the portion in which an image of the object is detected from the moving image data recorded in the first recording medium on the basis of the table.

BRIEF DESCRIPTION OF THE DRAWINGS

FIG. 1 is a schematic diagram illustrating an example of processing at recording time according to this invention;

FIG. 3 is a schematic diagram illustrating an example of processing at recording time according to this invention;

FIG. 5 is a schematic diagram for illustrating dubbing processing according to this invention;

FIG. 8 is a schematic diagram for illustrating an example of a relationship between a face-detection section and a position in stream data;

FIG. 10 is a schematic diagram illustrating an example of a face-detection playlist on which an item is recorded in accordance with a change in the number of face images;

FIG. 12 is a schematic diagram illustrating an example of a face-detection playlist in the case of identifying an individual of a face image; and FIG. 13 is a flowchart illustrating an example of dubbing processing according to a second embodiment of this invention.

DESCRIPTION OF THE PREFERRED EMBODIMENTS

Figures 2A, 2B:
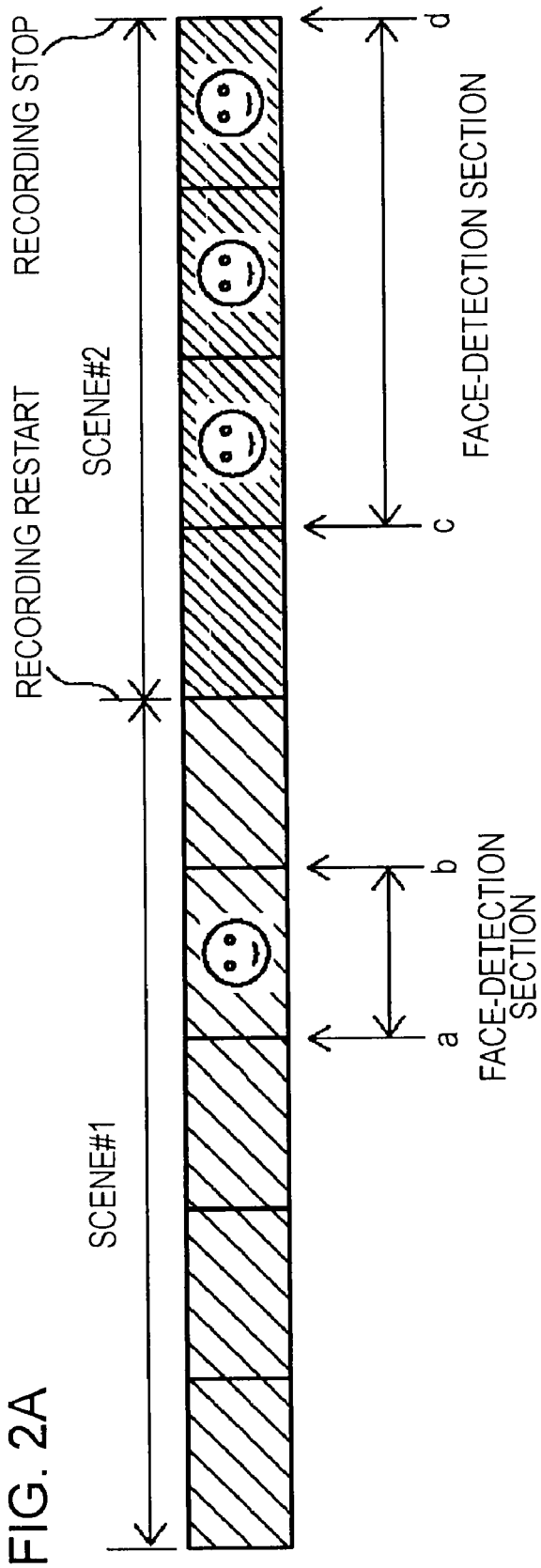
FIG. 2 is a schematic diagram illustrating an example of processing at recording time according to this invention.

In the following, a description will be given of a first embodiment of this invention. In this invention, for example, in an imaging apparatus, an image of an object included in a captured image is detected at the time of recording moving image data on the basis of an imaging signal, and a table in which information for specifying a playback section for the moving image data is generated on the basis of the detection result. The object to be detected is, for example, a human face. When the recorded moving data is dubbed onto another recording medium, only a section in which the object is detected is selectively dubbed using this table. Thereby, it is possible to extract a specific scene from the moving image data, and to perform dubbing work extremely easily.

A general description will be given of this invention using FIGS. 1 to 5. FIGS. 1 to 4 show an example of processing at recording time. As shown by an example in FIG. 1A, recording moving image data is started in accordance with a recording-start instruction, and the recording is stopped in accordance with a recording-stop instruction. Here, a scene is defined on the moving image data by setting a predetermined mark. That is to say, one scene is formed by a first and a second marks set on the moving image data. For example, by automatically setting a mark at recording start time and at recording stop time, a scene having a section from a recording-start position to a recording-stop position is automatically formed. In the example in FIG. 1A, a scene#1 is formed by a recording start and a recording stop.

The recording of moving image data is performed on a recording medium (in the following, an internal recording medium) built in, for example, a hard disk, etc. In this regard, mark information indicating a mark position is held in a predetermined way as management information of the moving image data. The management information is recorded on the internal recording medium in connection with the corresponding moving image data.

The moving image data of the scene#1 is subjected to, for example, image analysis for each frame, and a frame including an image of an object is detected. In the following, an object is assumed to be a human face, and a frame including an image of a human face (in the following, called a face image) is assumed to be detected. In the example of FIG. 1A, a face image is detected in a section from time a to time b in the scene#1. In this regard, time a and time b individually indicate playback time of the frame with respect to a reference time, such as a recording start point, etc.

The detection result of a face image is recorded on a face-detection playlist. As shown by an example in FIG. 1B, for example, a face-detection playlist is a table in which information (a scene number in this example) for identifying a face-image detected scene, and time information of a start point and an end point of a face-image detected section are individually recorded. In the example of FIG. 1A, a face image is detected in a section between time a and time b in the scene#1. Thus, as shown in FIG. 1B, the scene#1 as a list number#1, and time a, and time b are recorded.

In this regard, the information on the start point and the end point of a scene is separately generated as management information of moving image data, and is recorded.

It is assumed that after the recording of the scene#1 is stopped, the recording is started again to form a scene#2, and as shown by an example in FIG. 2A, face images have been detected in a section from time c to time d as a result of the image analysis on the moving image data of the scene#2. In this case, as shown by an example in FIG. 2B, the scene#2 and time c and time d, which individually indicate a start point and an end point of a section in which face images have been newly detected, are added to the information of the list number#1 based on the detection result of face image on the scene#1 described above in the face-detection playlist as information of the list number#2.

FIG. 3 illustrates an example of the case where no face image is detected in the moving data of the scene. That is to say, after the recording of the scene#2 is stopped, the recording is started again to form a scene#3. As shown by an example in FIG. 3A, no face image has been detected in the scene#3 as a result of the image analysis on the moving image of the scene#3. In this case, no information is added to the face-detection playlist as a matter of course (refer to FIG. 3B).

Figures 4A, 4B:
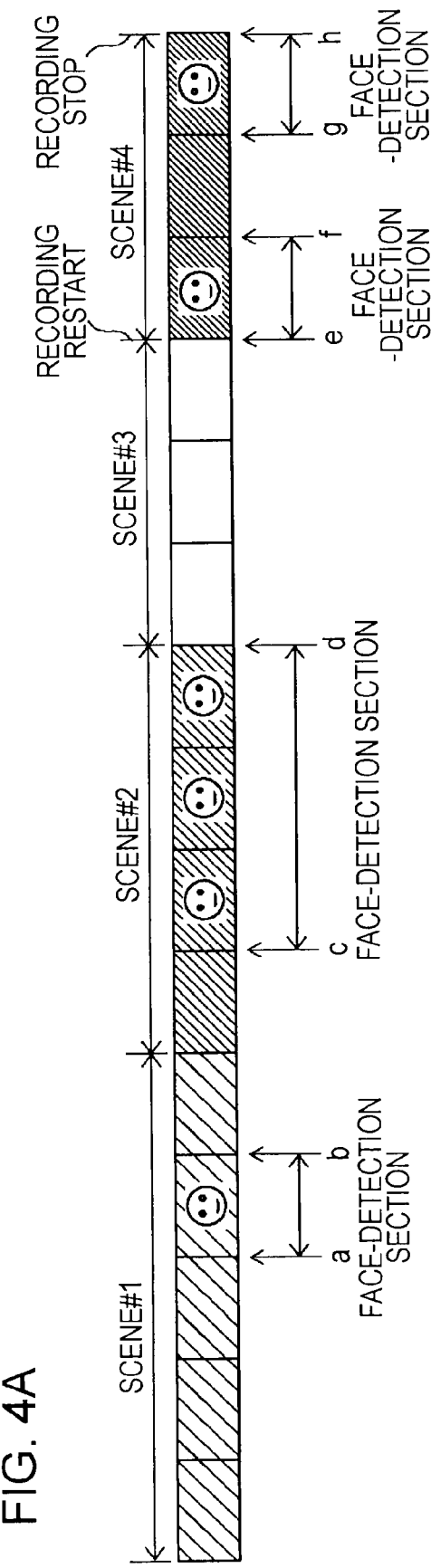
FIG. 4 is a schematic diagram illustrating an example of processing at recording time according to this invention.

FIG. 4 is an example of the case where there are a plurality of face-image detection sections for one scene. That is to say, it is assumed that after the recording of the scene#3 is stopped, the recording is started again to form a scene#4, and as shown by an example in FIG. 4A, face images have been detected in a section from time f to time g and in a section from time g to time h as a result of the image analysis on the moving image data of the scene#4. In this case, as shown by an example in FIG. 4B, the information corresponding to a section from time e and time f, and the information corresponding to a section from time g and time h, in which face images have been newly detected, are individually recorded in addition. That is to say, in the example of FIG. 4B, a scene number#4, and time e and time f is additionally recorded as information of a list number#3, and a scene number#4, and time g and time h is additionally recorded as information of a list number#4.

Next, a description will be given of processing which selectively dubs the sections in which a face image has been detected from the moving data recorded on the internal recording medium as described above to another recording medium using FIG. 5. FIGS. 5A and 5B correspond to the above-described FIGS. 4A and 4B, respectively, and show the moving image data recorded on the internal recording medium, and an example of a playlist showing the detection result of face images in the moving image data. From the face-detection playlist of FIG. 5B, it is understood that a face image has been individually detected in a section from time a to time b of the scene#1, a section from time c to time d of the scene#2, and sections from time e to time f and from time g to time h of the scene#4 in the moving image data recorded on the internal recording medium.

In this regard, it is assumed that information indicating a position, that is to say, a start point and an end point, of each scene on the moving image data is generated separately, and is recorded.

As shown by an example in FIG. 5C, sections in which a face image has been detected are extracted from the moving image data recorded on the internal recording medium on the basis of the face-detection playlist, and the extracted sections are connected to create one piece of moving image data. The moving image data produced by connecting the extracted sections is recorded onto another recording medium (in the following, called a dubbing-destination recording medium), such as a recordable DVD, for example, to perform dubbing.

For example, the section from time a to time b of the scene#1 is read from the moving image data on the internal recording medium on the basis of the information of the list number#1 of the face-detection playlist, and is recorded onto the dubbing-destination recording medium as a new scene#1'. In the same manner, the section from time c to time d of the scene#2 is read from the moving image data on the internal recording medium on the basis of the information of the list number#2 of the face-detection playlist, and is recorded onto the dubbing-destination recording medium as a new scene#2' so that the scene can be played back continuously with the scene#1'. Further, the section from time e to time f of the scene#4 is read from the moving image data on the internal recording medium on the basis of the information of the list number#3 of the face-detection playlist, and is recorded onto the dubbing-destination recording medium as a new scene#3' so that the scene can be played back continuously with the scene#2'. Furthermore, the section from time g to time h of the scene#4 is read from the moving image data on the internal recording medium on the basis of the information of the list number#4 of the face-detection playlist, and is recorded onto the dubbing-destination recording medium as a new scene#4' so that the scene can be played back continuously with the scene#3'.

In this manner, in the first embodiment of this invention, only the sections in which a face image has been detected are selectively extracted from the moving image data recorded on the internal recording medium, and the connected moving image data is recorded onto the dubbing-destination recording medium. Thus, it is possible to easily create a recording medium on which moving image data including only predetermined scenes without reviewing the scenes of the moving image data one by one for extraction.

Figure 6:
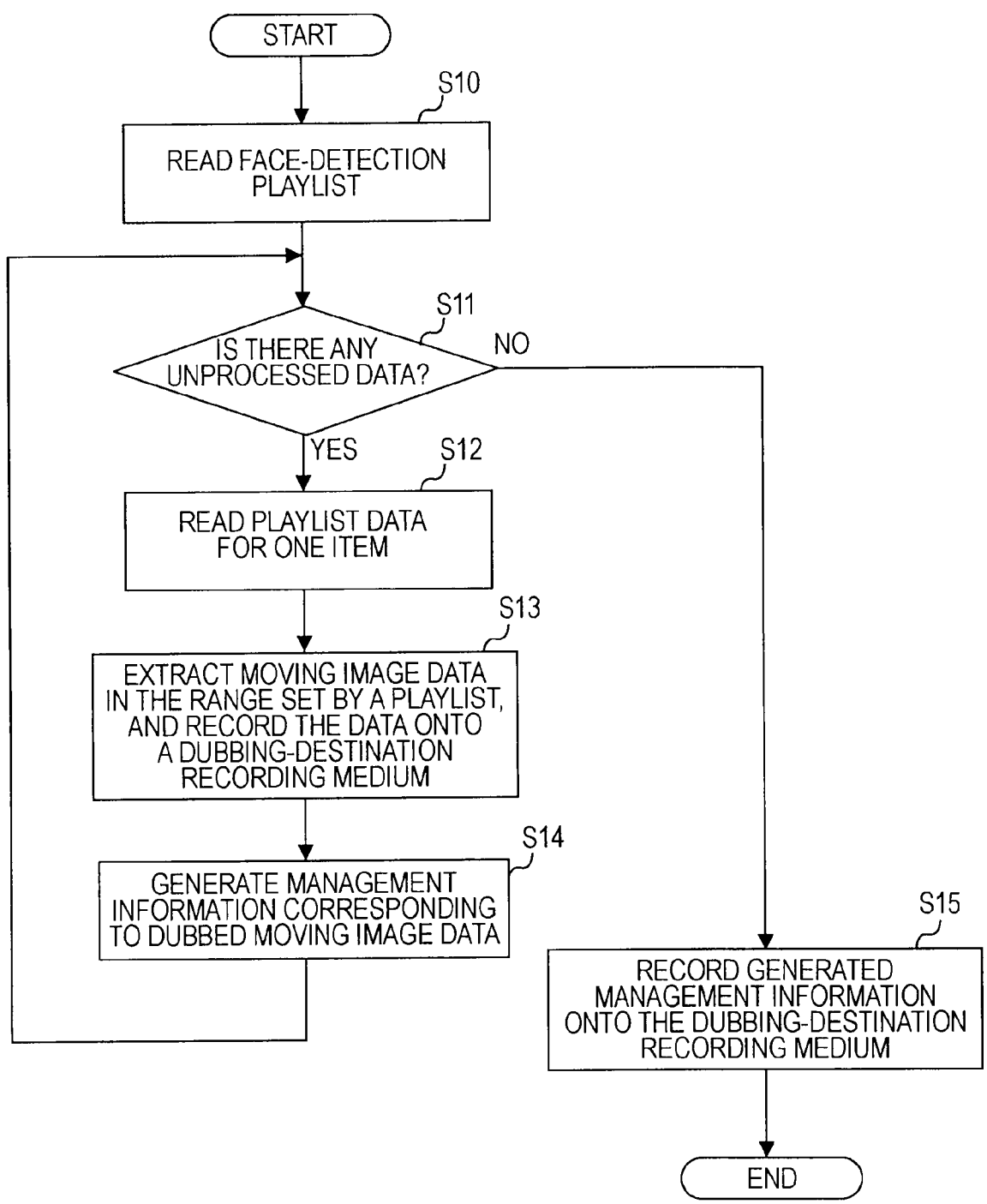
FIG. 6 is a flowchart illustrating an example of dubbing processing according to a first embodiment of this invention.

FIG. 6 is a flowchart illustrating an example of dubbing processing according to the first embodiment of this invention. First, in step S10, a face-detection playlist is played back from the internal recording medium, and is read into a memory, etc. Next, a determination is made on whether there is unprocessed data (step S11) on the basis of the read face-detection playlist. If determined that there is unprocessed data, the processing proceeds to step S12.

In step S12, one item of data is read from the face-detection playlist. For example, the data of the list number#1 recorded on the face-detection playlist is read by referring to, for example, FIG. 5B. Next, in the next step S13, the data in the range specified by the one item of data of the read face-detection playlist is extracted from the moving image data recorded on the internal recording medium. The extracted moving image data is recorded onto the dubbing-destination recording medium. For example, in the example of FIG. 5, the data of the list number#1 on the face-detection playlist exemplified in FIG. 5B is referenced, and as shown in FIG. 5C, the range of data from time a to time b of the scene#1 specified by the data of the lit number#1 is extracted to be recorded onto the dubbing-destination recording medium.

In step S14, the management information corresponding to the moving image data recorded onto the dubbing-destination recording medium in the above-described step S13 is generated. For example, for the moving image data extracted from the moving image data recorded on the internal recording medium on the basis of the face-detection playlist in step S13 and recorded on the dubbing-destination recording medium, a predetermined mark is individually set at the beginning and at the end of the data to form a scene. The management information is generated, for example, in memory, and is recorded onto the dubbing-destination recording medium at predetermined timing.

When the generation of the management information is completed, the processing returns to step S11, and the same processing is performed on the next data on the face-detection playlist. When processing for all the data on the face-detection playlist has been completed, the generated management information is recorded onto the dubbing-destination recording medium (step S15), and the dubbing processing based on the face-detection playlist is completed.

In this regard, in the above, a description has been given of the case where the dubbing processing is performed for all the data recorded on the face-detection playlist. However, the dubbing processing is not limited to this example. That is to say, desired data may be selected from the data recorded on the face-detection playlist, and the dubbing processing may be performed for the selected data.

Figure 7:
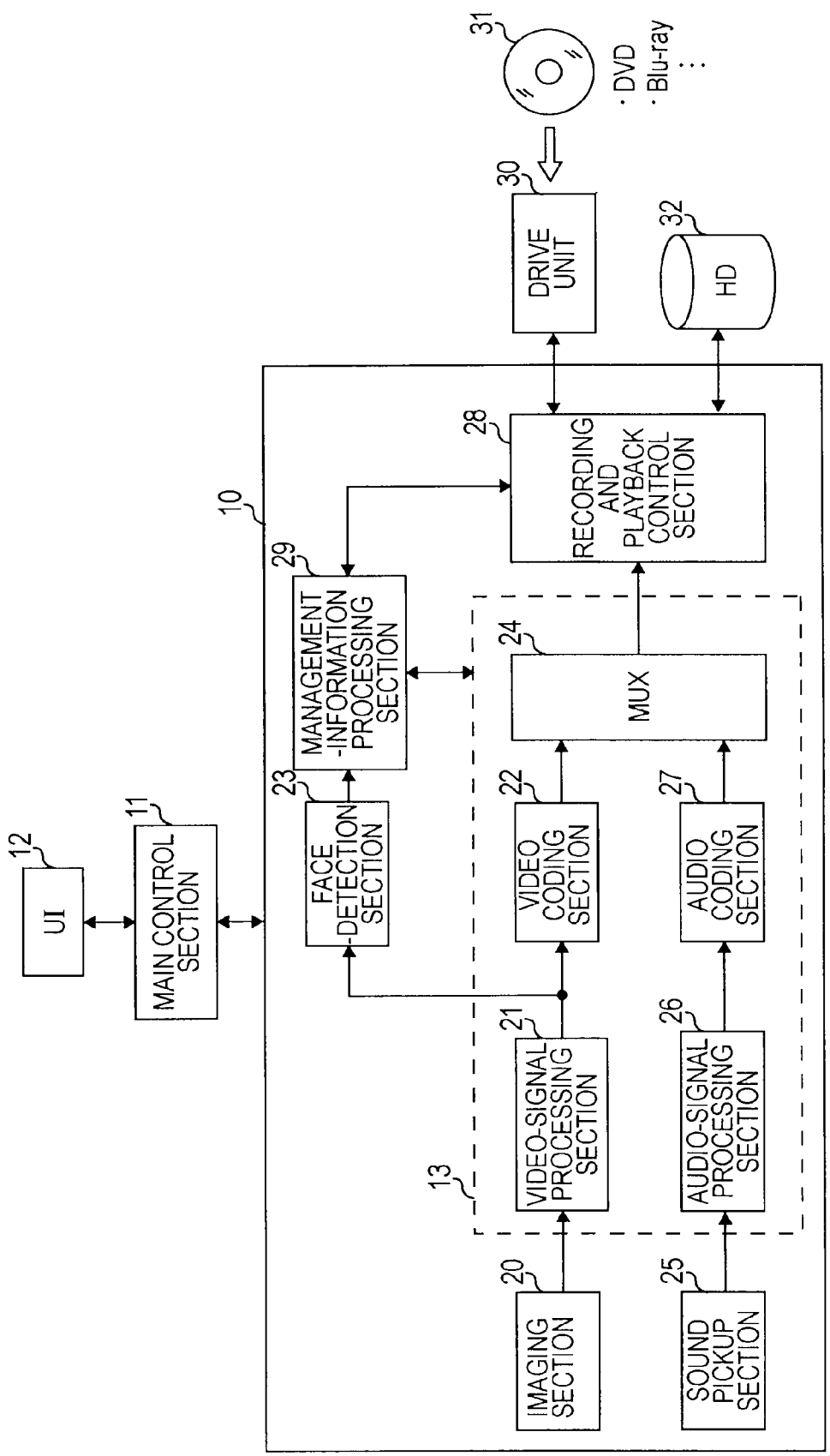
FIG. 7 is a block diagram illustrating an example of a configuration of an imaging apparatus to which the first embodiment of this invention can be applied.

FIG. 7 illustrates an example of a configuration of an imaging apparatus 1 to which the first embodiment of this invention can be applied. The imaging apparatus 1 has a recording and playback section 10, a main control section 11, and a UI (user interface) section 12. Further, the imaging apparatus 1 has a hard disk 32, which is an internal recording medium for recording and playing back data, and a drive unit 30 capable of recording and playing back data and mounting a face-detection recording medium 31 to which the data recorded in the hard disk 32 is dubbed.

The imaging apparatus 1 performs predetermined compression coding and multiplexing on the moving image data based on the imaging signal captured by an imaging device at each frame timing and the sound data based on the sound signal picked up by a microphone, etc., to produce stream data, and records the data onto a recording medium included in the imaging apparatus 1. Also, the imaging apparatus 1 has a function of dubbing the stream data recorded on a recording medium to anther detachable recording medium.

The recording format for the moving image data and the audio data that can be applied to the imaging apparatus 1 is considered to be various. For example, AVCHD, which is a recording format for recording an AV (Audio/Video) stream that is produced by multiplexing video data and audio data in a predetermined way onto a recordable recording medium, can be applied to the recording format of the imaging apparatus 1. In AVCHD, coding is performed in a method conforming to a coding method defined by ITU-T (International Telecommunication Union-Telecommunication Standardization Sector) recommendation H.264 or ISO (International Organization for Standardization)/IEC (International Electrotechnical Commission) International Standard 14496-10 (MPEG-4 part 10) Advanced Video Coding (in the following, abbreviated to H.264|AVC), and the coded moving image data and the audio data are multiplexed into stream data in accordance with the MPEG2 system.

The coding is not limited to this, and the coding of the moving image data may comply with the MPEG2 (Moving Pictures Experts Group 2) method, and the multiplexing of the moving image data and the audio data may comply with the MPEG2 system. A coding and multiplexing method, such as QuickTime (registered trademark), etc., which is used mainly by a personal computer, etc., may also be used.

In this regard, not only a standardized format, such as AVCHD described above, but also an original format can be applied to the recording format at the time of recording onto an internal recording medium of the imaging apparatus 1. On the other hand, the employment of a standardized format is preferable as a recording format at the time of recording onto a detachable recording medium, because the compatibility with another apparatus can be ensured.

The main control section 11 is, for example, a program running on a CPU (Central Processing Unit) not shown in the figure, and controls each part of the imaging apparatus 1 on the basis of the program and data stored, in advance, in a ROM (Read Only Memory) connected to the CPU using a RAM (Random Access Memory) similarly connected to the CPU. In this regard, the paths connecting the main control section 11 and each part of the recording and playback section 10 are omitted in FIG. 7 in order to avoid complication.

The UI section 12 is provided with operators for a user to perform the operations of the imaging apparatus 1 in a predetermined way, and outputs a control signal in accordance with the operation on the operators. The main control section 11 controls the operation of each section of the recording and playback section 10 by the program processing based on the control signal supplied from the UI section 12 in accordance with the user's operation. Also, the UI section 12 has a display section (not shown in the figure) including, for example, an LCD (Liquid Crystal Display), and can display the operation state of the imaging apparatus 1 and necessary information for the user's operation, etc.

For example, in response to the operation performed on the UI section 12, the main control section 11 controls the start and stop operations of the recording of data on the hard disk 32 by the imaging apparatus 1, the playback operation playing back data from the hard disk 32, further the dubbing processing of the data recorded in the hard disk 32 onto the dubbing-destination recording medium 31 mounted on the drive unit 30, and the like.

The recording and playback section 10 has an imaging section 20, a sound pickup section 25, a signal processing section 13, a face-detection section 23, a management information processing section 29, and a recording and playback control section 28. The imaging section 20 has an optical section including a lens system, an aperture mechanism, a focus mechanism, a zoom mechanism, etc., an imaging device for converting light emitted through the optical section into an electronic signal by photoelectric conversion, and an imaging-signal processing section performing noise reduction processing, gain control processing, etc., on the imaging signal output from the imaging device. For the imaging device, a CCD (Charge Coupled Device), a CMOS (Complementary Metal-Oxide Semiconductor) imager, etc., can be used.

The imaging signal output from the imaging section 20 is converted into a digital signal by an A/D converter not shown in the figure, is input into the signal processing section 13, and is supplied to a video-signal processing section 21. The video-signal processing section 21 converts the supplied digital signal into moving image data including, for example, luminance data (Y) and color-difference data Cr/Cb, performs predetermined image-quality correction processing, such as white-balance processing, gamma correction processing, etc., and further performs edge enhancement processing, resolution conversion processing, etc., as necessary.

The moving image data output from the video-signal processing section 21 is supplied to a video-coding section 22 and to a face-detection section 23. The video-coding section 22 performs compression coding on the supplied moving image data by a predetermined method. The compression coding method that can be applied to the video-coding section 22 includes the MPEG2 method, a method defined by H.264|AVC, etc. In the following, the video-coding section 22 performs compression coding on the supplied moving image data by the MPEG2 method.

As an example, the video-coding section 22 divides a frame of the supplied moving image data into a coding block having a predetermined size, for example, 8×8 pixels, and performs DCT for each coding block. Next, the DCT coefficients obtained by the DCT is quantized by a quantization scale. Also, the video-coding section 22 performs interframe coding by prediction coding using motion compensation on the supplied moving image data. At this time, the video-coding section 22 performs interframe coding using an I (Intra-coded) picture, which is a picture based on intraframe coding, and a P (Predictive-coded) picture and a B (Bi-directionally predictive coded) picture, which are based on prediction coding. Next, coding is performed such that a self-completing group (GOP: Group Of Picture) including at least one piece of I picture that can be decoded by itself becomes a minimum unit which is independently accessible. By performing coding using the GOP structure, it is possible to easily perform playback control, such as search, jump, etc.

The data which has been subjected to intraframe coding and interframe coding is compressed by variable-length coding. The compressed moving image data output from the video-coding section 22 is supplied to a multiplexer (MUX) 24.

The face-detection section 23 performs image analysis on the moving image data supplied from the video-signal processing section 21, and detects a face image from frames of the moving image data. For a method of detecting a face image, for example, methods disclosed in Japanese Unexamined Patent Application Publication Nos. 2004-30629 and 2005-157679 can be applied.

For example, a predetermined detection frame is set for a frame, and a comparison is made on the luminance data of predetermined two points in the detection frame. By comparing the comparison result with a pattern dictionary obtained by learning in advance, a detection is made on whether a face image is included in the detection frame. A plurality of combinations of the predetermined two points are set in the detection frame, and comparisons are made on the luminance data of individual combinations. The comparison result is compared with the pattern dictionary to obtain the likelihood of face (probability). This processing is performed while scanning the detection frame in the frame, with the absolute detection frame size being fixed, and by changing the frame size. Among the probabilities obtained in this manner, a detection frame whose obtained probability is a threshold value or more is determined as a detection frame including a face image, for example. The detection result of a face image is supplied to the management-information processing section 29.

The detection processing of a face image by the face-detection section 23 is carried out on a cycle of, for example, several frames to tens of frames (a few seconds). Of course, if the image analysis processing and face-image detection processing by the face-detection section 23 can be performed at a sufficiently high speed, the detection processing of a face image may be performed for each frame.

In this regard, in the imaging apparatus 1, it is possible to display the moving image data output from the video-signal processing section 21 to a display section (not shown in the figure) disposed on the above-described UI section 12. Thereby, it is possible for a user to check the captured image by the imaging section 20. Also, it is possible to display the image based on the display control signal generated by the main control section 11 in a predetermined way to the display section. Thus, it is possible to display information indicating various states of the imaging apparatus 1 to the display section. Further, it is possible to display the video based on the moving image data output from the video-signal processing section 21 and the image based on the display control signal generated by the main control section 11 by superimposition.

The sound pickup section 25 has a microphone, performs predetermined signal processing, such as noise reduction processing on the audio signal output from the microphone, and performs A/D conversion to output digital audio data. The audio data is input into the signal processing section 13, and is supplied to an audio-signal processing section 26. The audio-signal processing section 26 performs predetermined signal processing, such as amplification processing, sound-quality correction processing on the supplied audio data.

The audio data output from the audio-signal processing section 26 is supplied to an audio-coding section 27, and is subjected to predetermined compression coding. The compression coding method applicable to the audio-coding section 27 is considered to be various methods, such as the MP3 (Moving Pictures Experts Group 1 Audio Layer 3) method, the AAC (Advanced Audio Coding) method, etc. In the audio-coding section 27, the audio data may be subjected to compression coding using the Dolby Digital (registered trademark) method. The audio data output from the audio-coding section 27 is supplied to the multiplexer 24.

The multiplexer 24 multiplexes the compressed moving image data supplied from the video-coding section 22 and the compressed audio data supplied from the audio-coding section 27 into one stream data. For example, the multiplexer 24 has a buffer memory, and temporarily stores the supplied compressed moving image data and compressed audio data into the buffer memory. The compressed moving image data and the compressed audio data stored in the buffer memory are individually divided into each data of a processing size, a header is added to the data, and the data is packetized. Information necessary for decoding the compressed moving image data produced by compression coding by the MPEG2 method, such as PTS (Presentation Time Stamp) indicating the playback time of the data stored in the packet and DTS (Decoding Time Stamp) indicating decoding time are stored into the header. This packet may be further divided, and may be stored into a fixed-length packet.

The multiplexed stream data formed from the compressed moving image data and the compressed audio data by the multiplexer 24 is supplied to the recording and playback control section 28. The recording and playback control section 28 has, for example, a buffer memory, and temporarily stores the packet supplied from the multiplexer 24 into the buffer memory. By controlling the timing of reading and writing a packet into the buffer memory in a predetermined way, a matching is made between an access speed of each recording medium described below and a signal processing speed, such as the compression coding of the moving image data and the audio data, etc.

Also, the recording and playback control section 28 controls the recording and the playback of the data onto a plurality of recording medium. In the example in FIG. 7, the drive unit 30 is connected to the recording and playback control section 28, and the internal hard disk 32 of the imaging apparatus 1 is also connected to the recording and playback control section 28. The drive unit 30 is assumed to be capable of reading and writing data, for example, on a recordable DVD (Digital Versatile Disc).

The drive unit 30 is not limited to this, and the drive unit 30 may allow reading and writing onto a recording medium, such as Blu-ray Disc (registered trademark), for example, which achieves a larger storage capacity than a DVD. Also, the drive unit 30 may support both a recordable DVD and a Blu-ray Disc. Further, the drive unit 30 may support the reading and writing of data in a detachable and nonvolatile semiconductor memory, such as a flash memory.

The recording and playback control section 28 writes data at a specified address, or reads data from a specified address on a specified recording medium on the basis of an instruction from the upper level, such as the main control section 11, for example.

The function of the management information processing section 29 is achieved by the above-described main control section 11 and the program running on the CPU. Of course, it is possible to configure the management information processing section 29 and the main control section 11 by individually different hardware.

The management-information processing section 29 exchanges data with the multiplexer 24, the video-coding section 22, the audio-coding section 27, and recording and playback control section 28, and generates the management information on the stream data recorded on the recording medium by the recording and playback control section 28. At the same time, the management-information processing section 29 generates information for the recording and playback control section 28 controlling the reading and the writing of the stream data from/to the recording medium 31 and the hard disk 32 on the basis of the management information read from the recording medium 31 and the hard disk 32.

The management information generated by the management-information processing section 29 includes, for example, information managing scenes included in stream data, information managing stream data itself as a title, and the like. The information managing scenes includes the information indicating, for example, the beginning and the end of a scene, such as the recording start time and the stop time, which is indicated by the PTS. The recording start time and the stop time may be indicated by the frame number of the frame having the recording start time and the stop time with a base point of the beginning frame of the stream data. Also, the management information may further include map information relating the playback time of each packet included in the stream data and the byte position on the stream data of each of the packets.

Also, the management-information processing section 29 generates the above-described face-detection playlist on the basis of the detection result of the face images by the face-detection section 23. The information of the start point and the end point of face detection, which indicates a face-detection section, can be indicated, for example, by a relative frame number on the basis of the beginning frame of a scene including the start point and the end point. Of course, the PTS of the start point and the end point may be used for information indicating the start point and the end point on the face-detection playlist.

A general description will be given of the operation, at image capturing time and at recording time, of the imaging apparatus 1 having such a configuration. The imaging signal output from the imaging section 20 is converted into a digital signal by an A/D converter not shown in the figure, and is supplied to the video-signal processing section 21. The digital imaging signal is subjected to predetermined signal processing by the video-signal processing section 21, is output as moving image data, and is supplied to the face-detection section 23 and the video-coding section 22.

For example, if an instruction to start recording is given to the UI section 12, the overall recording and playback section 10 is controlled by the main control section 11 on the basis of the control signal in accordance with the instruction to start a recording operation, and the recording operation is started. The video-coding section 22 performs compression coding on the supplied moving image data in a predetermined way, and outputs the data as moving image data having a GOP structure. The stream is supplied to the multiplexer 24.

At the same time, the face-detection section 23 detects a face image from the supplied moving image data for several frames to tens of frames, or for each frame, and passes the detection result in sequence to the management-information processing section 29. The management-information processing section 29 exchanges data with the signal processing section 13, identifies the frame in which a face image has been detected, and obtains the range in which a face image has been detected. The management-information processing section 29 records information indicating the range in which a face image has been detected in the face-detection playlist. The face-detection playlist is stored into, for example, a memory not shown in the figure. The management-information processing section 29 manages the face-detection playlist and the corresponding moving image data in connection with each other.

The audio data output from the sound pickup section 25 is subjected to predetermined signal processing by the audio-signal processing section 26, is subjected to coding by the audio-coding section 27, and is supplied to the multiplexer 24. The multiplexer 24 packetizes the stream of the moving image data supplied from the video-coding section 22 and the audio data supplied from the audio-coding section 27 in a predetermined way, performs time-division multiplexing to output one piece of stream data. The stream data is supplied to the recording and playback control section 28.

The recording and playback control section 28 stores the stream data supplied from the multiplexer 24 into a buffer memory not shown in the figure. When the data for a recording unit of the hard disk 32 is written into the buffer memory, the data is read from the buffer memory, and is recorded into the hard disk 32.

At the same time, the face-detection playlist generated by the management-information processing section 29 is passed to the recording and playback control section 28 at predetermined timing, and is recorded into the hard disk 32. The face-detection playlist is recorded into the hard disk 32, for example, at the timing when a recording stop is instructed. For example, by an instruction from the main control section 11 based on the control signal in accordance with the operation of instruction of a recording stop issued on the UI section 12, the face-detection playlist is read from memory, and is recorded into the hard disk 32 by the recording and playback control section 28. The timing is not limited to this, and it is also possible to record the face-detection playlist into the hard disk 32 at the timing of turning off the power to the imaging apparatus 1.

The face-detection playlist is recorded into the hard disk 32 in a predetermined relationship with the stream data including the corresponding to moving image data. Forming a relationship between the face-detection playlist and the stream data is considered to be done by giving file names corresponding to each other. Also, it is thought that a management file showing the corresponding relationship between the face-detection playlist recorded in the hard disk 32 and the stream data is further generated.

Next, a general description will be given of the dubbing processing based on the face-detection playlist described using the flowchart in FIG. 6 in comparison with the configuration of the imaging apparatus 1. Here, the dubbing-destination recording medium 31 is assumed to be a recordable DVD (in the following, simply abbreviated to a DVD), and sections in which a face image has been detected are extracted from the stream data recorded in the hard disk 32, and are dubbed onto the dubbing-destination recording medium 31.

When the dubbing-destination recording medium 31 is mounted onto the drive unit 30, the main control section 11 recognizes the recording medium 31. In this regard, the management information recorded in the hard disk 32 is, for example, read from the hard disk 32 at the start time of the imaging apparatus 1, for example, and is stored in a memory, not shown in the figure, of the management information processing section 29 in advance.

For example, the user operates on the UI section 12 to give an instruction for extracting a face-detection section from stream data recorded in the hard disk 32 to dub the data onto the dubbing-destination recording medium 31. The UI section 12 generates a control signal in accordance with this operation, and supplies the signal to the main control section 11. The main control section 11 starts the dubbing processing of the face-detection section in response to the control signal.

The control section 11 issues an instruction to the recording and playback control section 28 to read the face-detection playlist recorded in the hard disk 32. The recording and playback control section 28 reads the face-detection playlist from the hard disk 32 in response to this instruction, and passes it to the management-information processing section 29. The management-information processing section 29 stores the face-detection playlist into a memory not shown in the figure (step S10 in FIG. 6).

The management-information processing section 29 reads the face-detection playlist in the memory by each row, and performs processing for each item of playlist data (step S12 in FIG. 6). For example, the management-information processing section 29 reads a scene number, information on a start point and an end point of a face-detection section for one item of the playlist data, and obtains the position corresponding to the start point and the end point on the stream data recorded in the hard disk 32.

A description will be given of an example of a relationship between a face-detection section and a position in stream data using FIG. 8. As already described, in this example, the video-coding section 22 performs coding of the moving image data by the MPEG2 method with a GOP structure using an I picture, a P picture, and a B picture. Thus, a minimum access unit on the moving image data in the stream data is each GOP. On the other hand, the face detection processing by the face-detection section 32 is performed on the moving image data before compression coding, and thus a start point and an end point of face detection are expressed for each frame.

Accordingly, as shown by an example in FIG. 8, a dubbing position is set by the GOP including a picture in which a face image has been detected. More specifically, the beginning of the dubbing position is determined to be a beginning boundary of the GOP including the picture to be a start point of a face-detection section, and the end of the dubbing position is determined to be an end boundary of the GOP including the picture to be an end point of the face-detection section. The management-information processing section 29 can obtain the GOPs including the pictures of the start point and the end point of the face-detection section on the basis of the read management information and the face-detection playlist.

Here, an I picture can be decoded independently, and thus it is thought that the face detection processing by the face-detection section 23 is performed on an I-picture cycle. In this case, as shown by the example in FIG. 8, the face-detection section becomes a section from an I picture of a certain GOP to an I picture of another GOP. The dubbing position becomes a section from the beginning boundary of the GOP including the I picture to be a start point of a face-detection section to the end boundary of the GOP including the I picture to be an end point of the face-detection section.

The determination of the dubbing position is not limited to this, and the face detection processing by the face-detection section 23 can be performed on a cycle having no relationship with the GOP cycle.

In this regard, if the video-coding section 22 performs coding of the moving image data by the H.264|AVC method, it is possible to match the reference relationship among frames by interframe coding with MPEG2. It is therefore possible to apply the above description to an example of the coding of moving image data using the H.264|AVC method.

As described above, the management-information processing section 29 determines the dubbing range on the stream data recorded in the hard disk 32 on the basis of the management information and the face-detection playlist, and passes the information indicating the dubbing range, together with a dubbing instruction, to the recording and playback control section 28. The recording and playback control section 28 reads the data of the range indicated by the dubbing range information from the stream data in accordance with the dubbing instruction, and writes the data into, for example, a buffer memory. Next, when data for the recording unit of the dubbing-destination recording medium 31 is stored into the buffer memory, the recording and playback control section 28 reads the data from the buffer memory, and supplies the data to the drive unit 30. The drive unit 30 records the supplied data onto the dubbing-destination recording medium 31 in sequence in a predetermined way (step S13 in FIG. 6).

The management-information processing section 29 generates the management information corresponding to the stream data dubbed on the dubbing-destination recording medium 31 (step S14 in FIG. 6). For example, a pair of the PTS of the beginning picture and the PTS of the end picture in the dubbed range is recorded in order to record the scene. The recording is not limited to PTSs, and for example, frame numbers may be used. The generated management information is temporarily stored into a memory, for example, and is written onto the dubbing-destination recording medium 31 at predetermined timing (step S15 in FIG. 6). For example, the management information is written into the dubbing-destination recording medium 31 at the time of ejecting the dubbing-destination recording medium 31 from the drive unit 30, at the time of turning the power OFF to the imaging apparatus 1 while the dubbing-destination recording medium 31 is mounted in the drive unit 30, and the like.

When, for example, AVCHD is employed for the recording format, the management information includes a clip information file, a movie playlist file, and an index table file.

When the management information on the dubbing-destination recording medium 31 is generated, the processing returns to step S11, and the dubbing processing is performed for the next playlist data recorded on the face-detection playlist. That is to say, the playlist data is read into the management-information processing section 29 (step S12 in FIG. 6), the dubbing range is set for the stream data in the hard disk 32 on the basis of the read playlist data, the data in the dubbing range is read from the hard disk 32, and the data is recorded onto the dubbing-destination recording medium 31 through the buffer memory (step S13 in FIG. 6).

Next, the management information corresponding to the stream data dubbed onto the dubbing-destination recording medium 31 is additionally generated (step S14 in FIG. 6). At this time, the management information is generated such that a continuous playback becomes possible with the stream data dubbed immediately before on the dubbing-destination recording medium 31. For example, it is thought that the end PTS in the dubbing range that has been dubbed immediately before is referenced from the management information, the PTS indicating the next frame timing to the frame indicated by that PTS is determined to be the beginning PTS in the newly dubbed range. The generation of the management information is not limited to this. Alternatively, it is thought that information indicating a continuous playback, at a frame timing, of the stream in the dubbing range that has been dubbed immediately before and the stream in the newly dubbed range are described as the management information.

In this manner, when the dubbing processing is performed for all the playlist data recorded on the face-detection playlist (step S11 in FIG. 6), a series of dubbing processing is completed.

Next, a description will be given of a first variation of the first embodiment of the present invention. In the above, a description has been given of an example of the case where one face image is detected from the moving image data. However, in reality, it is thought that there are many cases where there are a plurality of persons in a screen captured by the imaging apparatus 1, and a plurality of face images are detected from the moving image data. The first variation and the second variation described below of the first embodiment are for the dubbing processing in the case where a plurality of face images are detected from the moving image data in this manner.

In this regard, the configuration of the above-described imaging apparatus 1 can be applied to the first variation of the first embodiment without change, and thus the description of the configuration will be omitted.

Figure 9A:
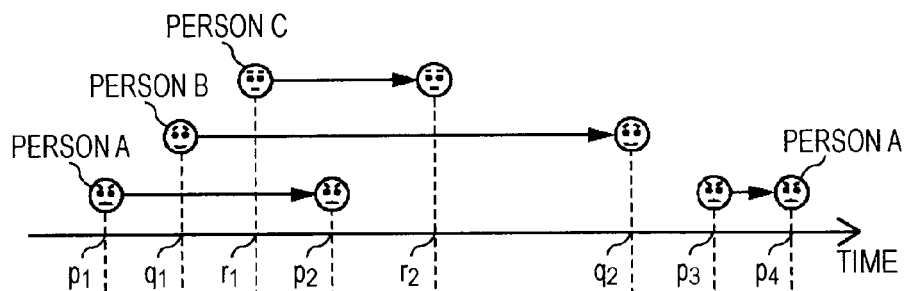
FIG. 9 is a schematic diagram for illustrating a first variation of the first embodiment of this invention.
Figure 9B:
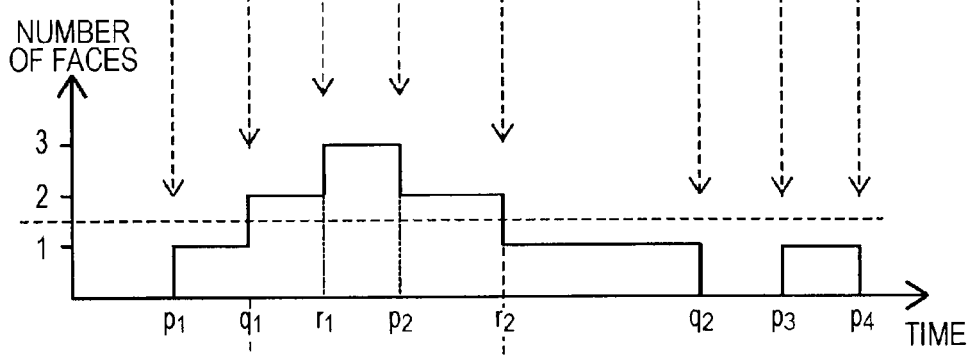

As an example, as shown in FIG. 9A, it is assumed that three persons, a person A, a person B, and a person C are captured by the imaging apparatus 1. At this time, it is assumed that the person A enters into an imaging screen of the imaging apparatus 1 from time $p_1$ to time $p_2$, and then enters into the imaging screen again from time $p_3$ to time $p_4$. Similarly, it is assumed that the person B enters into the imaging screen from time $q_1$ to time $q_2$, and the person C enters into the imaging screen from time $r_1$ to time $r_2$. Accordingly, as shown by an example in FIG. 9B, from the moving image data obtained by the imaging apparatus 1, one face image is individually detected during the time period from time $p_1$ to time $q_1$, from time $r_2$ to time $q_2$, and from time $p_3$ to time $p_4$. Also, two face images are detected during the time period from time $q_1$ to time $r_1$, and from time $p_2$ to time $r_2$, and three face images are detected during the time period from time $r_1$ to time $r_2$.

In this regard, when, for example, there are a plurality of detection frames detected including a face image in one frame, the face-detection section 23 can determine whether the detection frames include face images of different faces with each other on the basis of the overlapping of these plurality of detection frames and the distance between the detection frames, the sizes of the detection frames, etc. If the detection frames detected including a face image are determined to include face images of different faces with each other, the number of face images of different faces with each other that are included in one frame at that time is counted.

In this case, it is thought that the time when the number of face images of different faces with each other included in one frame has changed and the number of detected face images before and after the change are recorded on the face-detection playlist in connection with each other. The recording on the face-detection playlist is not limited to this, and the time of detection of a face image and the number of face images included in one frame may be recorded in connection with each other.

FIG. 10 illustrates an example of a face-detection playlist on which an item is recorded in accordance with a change in the number of face images. The face-detection playlist in FIG. 10 is an example in which time indicating a change point in the number of detected face images and the number of face images immediately after the change point are recorded in connection with each other. For example, referring to the above-described FIG. 9A, time $p_1$, time $q_1$, time $r_1$, time $p_2$, time $r_2$, time $q_2$, time $p_3$, and time $p_4$ are individually recorded as change points, and the numbers of face images immediately after the change points are one, two, three, two, one, zero, one and zero are individually recorded in connection with the individual change points.

Figure 9C:
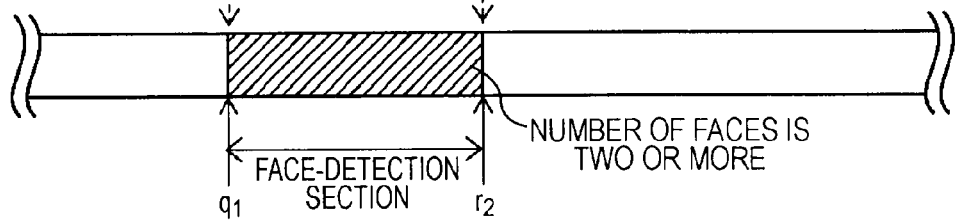

When a playlist is generated in accordance with a change in the number of face images detected in one frame, it is thought that the dubbing range of the data to be dubbed onto the dubbing-destination recording medium 31 is determined on the basis of a threshold value for the number of face images. Assuming that, as an example, the threshold value is two, and a face-detection section is a section in which two or more face images of different faces are detected in one frame. A section in which two or more face images are detected is obtained on the basis of the face-detection playlist exemplified in FIG. 10. At change point $d_1$, the number of face images is changed from one to two, and at change point $e_2$, the number of face images is changed from two to one. Accordingly, as shown in FIG. 9C, it is possible to determine that two or more face images are detected in the section from time $q_1$ to time $r_2$, and this section is determined to be the target of dubbing processing.

In this regard, the dubbing processing itself after the identification of the target of dubbing processing is the same as the processing of the above-described first embodiment, and thus the description thereof will be omitted.

Next, a description will be given of a second variation of the first embodiment of the present invention. In the second variation of the first embodiment, an individual is identified for the detected face image at the time of detecting a face image. At the time of dubbing processing, the target of dubbing is determined on the basis of the face image that is identified as a specific individual.

In this regard, the configuration of the above-described imaging apparatus 1 can be applied to the second variation of the first embodiment without change, and thus the description of the configuration will be omitted.

For a method of identifying an individual of a detected face image, it is thought that, for example, for a face image to be identified, characteristic information from which a face image can be identified is recorded in advance, a comparison is made between characteristic information extracted from individual face images detected from one frame and the recorded characteristic information, and the face image is identified on the basis of the comparison result.

For example, by taking the case of the above-described first embodiment as an example, a detection frame is set for a face image of a face to be identified, and a comparison is made on the luminance data of a plurality of predetermined two points in the detection frame. The comparison result is recorded in a dictionary in advance as characteristic information of the face image. When the face-detection section 23 detects a face image in one frame, the face-detection section 23 obtains the similarity between the faces by applying the characteristic information of the face image recorded in the dictionary to the detection frame determined to include the face image. It is thought that the similarity is obtained, for example, on the basis of the difference between the comparison result of the luminance data of a predetermined two points in the detection frame determined to include the face image and the characteristic information of the recorded face image. For example, the smaller the difference is, the higher the similarity is defined to be. If the similarity is a threshold value or higher, the face image included in the detection frame is the face image to be identified.

A more specific description will be given of a method of setting a dubbing range according to the second variation of the first embodiment using FIG. 11. In this regard, FIG. 11A corresponds to the above-described FIG. 9A. For example, referring to FIG. 11A, it is assumed that among a person A, a person B, and a person C, which are captured by the imaging apparatus 1, a portion of the screen including the person A is to be selected as a scene to be dubbed.

In this case, it is necessary to record the characteristic information of the face image on the person A to the face-detection section 23. A method, in which the imaging apparatus 1 has captured the face of the person A in advance, and the characteristic information is extracted and recorded on the basis of the captured face image of the person A, is considered. The method is not limited to this, and a method of recording a face image to be identified on the basis of the moving image data being captured is also considered. For example, the UI section 12 is provided with specification mean for a position in the display section, and the face image to be identified is specified by the position-specification means while displaying the video being captured in the display section.

The face-detection section 23 analyzes the moving image data supplied from the video processing section 21, detects a face image included in a frame, at the same time, for example, compares the detected face image and the recorded face image of the person A, and determines whether the similarity is a threshold value or higher. If the similarity is a threshold value or higher, the face-detection section 23 records the time when the face image has been detected on the face-detection playlist as a start point of the face-detection section. Also, the face-detection section 23 records the time when the face image has not been detected as an end point of the face-detection section on the face-detection playlist.

Figure 11A:
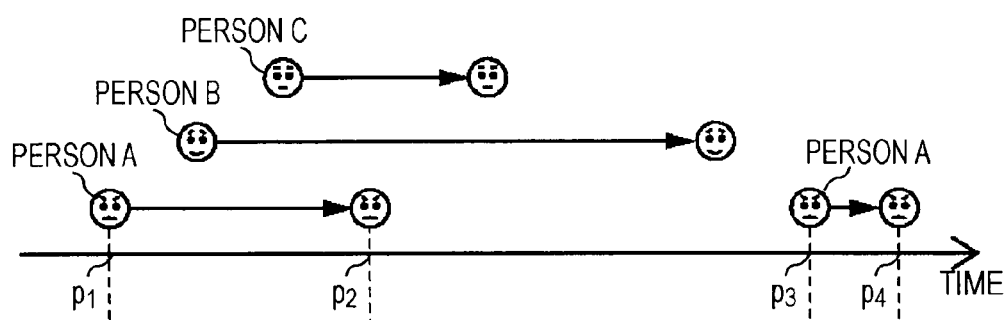
FIG. 11 is a schematic diagram for illustrating a method of setting a dubbing range by a second variation of the first embodiment.
Figure 11B:
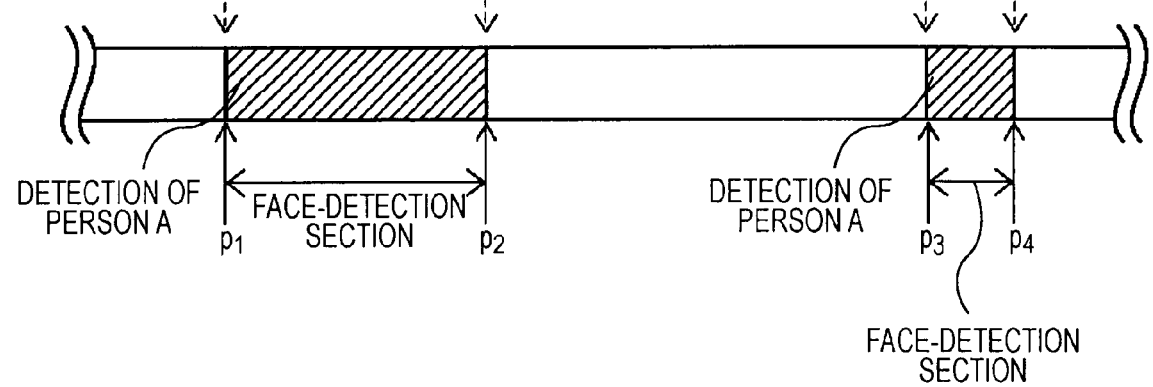

In the example in FIG. 11A, the person A enters into the capture screen at time $p_1$, goes out from the capture screen at time $p_2$, enters into the capture screen at time $p_3$ again, and goes out from the capture screen at time $p_4$. In this case, as exemplified in FIG. 11B, the face image of the person A is detected during the time period from time $p_1$ to time $p_2$, and the time period from time $p_3$ to time $p_4$, and the section from time $p_1$ to time $p_2$, and the section from time $p_3$ to time $p_4$ are to be the target of the dubbing processing.

FIG. 12 illustrates an example of a face-detection playlist in the case of identifying an individual of a face image. In the example of FIG. 12, referring to FIG. 11A, the face images of the person A, the person B, and the person C are recorded, and pieces of identification information "001", "002", and "003" are individually related. In this manner, it is possible to record a plurality of face images, and to recognize them individually. In the example of FIG. 12, a pair of a start point and an end point is related to identification information, and is recorded on the face-detection playlist. For example, by specifying the identification information "001" for the face-detection playlist, it is possible to selectively identify the sections including the person A in the capture screen as the section to be dubbed.

In this regard, the dubbing processing itself after the identification of the target of dubbing processing is the same as the processing of the above-described first embodiment, and thus the description thereof will be omitted.

Next, a description will be given of a second embodiment of the present invention. In the second embodiment, for the dubbing processing by the above-described first embodiment, if the playback time for the range specified by a start time and an end time in the face-detection playlist is shorter than a predetermined time period, the dubbing of that range is not performed, and the processing is skipped. By doing so, it is possible to restrain scenes from frequently changing when the moving image data is played back after the dubbing.

FIG. 13 is a flowchart illustrating an example of dubbing processing according to the second embodiment of this invention. In this regard, in FIG. 13, the same reference numerals are given to the common processing (steps) to the processing of FIG. 6 described above, and thus a detailed description will be omitted. In step S10, the face-detection playlist is played back from the internal recording medium to be read into the memory, and the processing proceeds to step S101.

In step S101, a minimum length of the dubbing range at the time of the dubbing based on the face-detection playlist is determined. That is to say, if the playback time from a start point to an end point of the face-detection playlist is longer than the time period indicated by the set minimum length, the range from the start point to the end point is to be dubbed. The minimum dubbing length may be a fixed value, or may be a variable value.

If the minimum dubbing length is variable, for example the UI section 12 is provided with input means for entering a value of the minimum dubbing length. The user sets a time period using the input means. The time period set in this manner is determined to be the value of the minimum dubbing length. For the input means, for example, the user is allowed to enter the setting value directly by time, such as seconds, etc. The determination of the value is not limited to this. For example, input means capable of specifying a time period by a feeling, such as a slide bar, etc., may be disposed, and the minimum length may be set by this means. Furthermore, for example, the UI section 12 may be provided with an operator capable of being tapped by a finger, and the time period may be set in accordance with an interval of the tapping on the operator. Also, a plurality of fixed values may be stored in a ROM, etc., in advance, and the user may select one of them from the UI section 12.

In this regard, if the minimum dubbing length is variable, it is preferable to display the set time period so as to allow an intuitive check by the user in the display section not shown in the figure. For an example, it is thought that a predetermined animation is displayed for the set time period onto the display section.

When the minimum dubbing length is set in step S101, a determination is made on whether there is unprocessed data or not in step S11. If determined that there is unprocessed data, one item of the data is read from the face-detection playlist in step S12. In the next step S121, a determination is made on whether the playback time of the range specified for the one item of read data of the face-detection playlist is longer than the minimum dubbing length determined in the above-described step S101. If the playback time of the range specified for the target data of the face-detection playlist is determined to be shorter than the minimum dubbing length, the processing proceeds to step S11, and the processing on the next data on the face-detection playlist is performed.

On the other hand, in step S121, if the playback time of the range specified for the target data of the face-detection playlist is determined to be longer than the minimum dubbing length, the processing proceeds to step S13. The range specified by the face-detection playlist is extracted from the moving image data recorded on the internal recording medium, and is recorded onto the dubbing-destination recording medium.

As an example, in the data of the list number#1 of the face-detection playlist exemplified in FIG. 5B described above, if the difference in time from the start point a to the end point b is longer than the time period determined as the minimum dubbing length, the section from the start point a to the end point b is set as the dubbing range. On the other hand, if the difference in time from the start point a to the end point b is shorter than the time period determined as the minimum dubbing length, the processing of the list number#1 is skipped, and the next data on the face-detection playlist, that is to say, the processing for the data of the list number#2 is performed.

Next, in step S14, the management information corresponding to the moving image data recorded onto the dubbing-destination recording medium in the above-described step S13 is generated.

In this regard, here, a description has been given of the second embodiment as corresponding to the first embodiment. However, the second embodiment is not limited to this. That is to say, the second embodiment may be individually applied to the above-described first and the second variations.

In the above, a description has been given of the case where this invention is applied to an imaging apparatus, such as a portable video camera, for example. However, this invention is not limited to this. For example, this invention can be applied to a stationary video recorder. Also, it is thought that in a general-purpose information processing apparatus, such as a personal computer, the main control section 11, the signal processing section 13, the face-detection section 23, the management information processing section 29, the recording and playback control section 28, etc., in FIG. 7 are constituted by software.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing apparatus comprising:
   a detection section detecting an image of a face from moving image data and identifying an individual corresponding to the face;
   a table creation section recording identification information identifying the individual in association with position information indicating a position on the moving image data in a table on the basis of a detection result by the detection section;
   a dubbing processing section performing dubbing processing on the moving image data; and a control section controlling the dubbing processing section to select the position information corresponding to the individual on the basis of the identification information recorded in the table, to extract a portion of the moving image data recorded on a first recording medium on the basis of the selected position information, and to perform the dubbing processing on the extracted portion onto a second recording medium.

2. The data processing apparatus according to claim 1, wherein
the control section controls the dubbing processing section not to perform the dubbing processing if a playback time of the portion extracted from the moving image data is shorter than a threshold value on the basis of the selected position information.

3. The data processing apparatus according to claim 2, further comprising:
an operation section accepting a user's operation, wherein the threshold value is set by the user's operation onto the operation section.

4. The data processing apparatus according to claim 1, wherein
the control section creates a playlist storing playback control information for the portion of the moving image data to be dubbed at the time of the dubbing processing, and controls the dubbing processing section to record the created playlist onto the second recording medium.

5. The data processing apparatus according to claim 1, wherein
the table creation section records a position at which a number of images of faces detected in a frame of the moving image data has changed on the basis of the detection result of the detection section.

6. A method of processing data, comprising:
detecting an image of a face from moving image data;
identifying an individual corresponding to the face;
recording identification information identifying the individual in association with position information indicating a position on the moving image data in a table on the basis of a result of the detecting;
performing dubbing processing on the moving image data; and
controlling the performing dubbing processing to select the position information corresponding to the individual on the basis of the identification information recorded in the table, to extract a portion of the moving image data recorded on a first recording medium on the basis of the selected position information, and to perform dubbing processing on the extracted portion on a second recording medium.

7. A non-transitory computer-readable medium including a program, which when executed by a computer, causes the computer to perform a method of processing data, comprising:
detecting an image of a face from moving image data;
identifying an individual corresponding to the face;
recording identification information identifying the individual in association with position information indicating a position on the moving image data in a table on the basis of a result of the detecting;
performing dubbing processing on the moving image data; and
controlling the performing dubbing processing to select the position information corresponding to the individual on the basis of the identification information recorded in the table, to extract a portion of the moving image data recorded on a first recording medium the basis of the selected position information, and to perform dubbing processing on the extracted portion on a second recording medium.

* * * * *